United States Patent
Garcia Crespo et al.

(10) Patent No.: US 8,522,392 B2
(45) Date of Patent: Sep. 3, 2013

(54) AUTOMOBILE WINDSHIELD WIPER SYSTEM HAVING DIRECT DRIVE DRUM AND CABLE ASSEMBLY

(75) Inventors: Jose Maria Garcia Crespo, Troy, MI (US); Heather M. Flores, Dearborn, MI (US); Andre Sykula, Sterling Heights, MI (US); Bradley Napier Doman, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1010 days.

(21) Appl. No.: 12/534,339

(22) Filed: Aug. 3, 2009

(65) Prior Publication Data
US 2011/0023253 A1   Feb. 3, 2011

(51) Int. Cl.
*B60S 1/20* (2006.01)
(52) U.S. Cl.
USPC ............... 15/250.25; 15/250.27; 15/250.3; 74/89.22
(58) Field of Classification Search
USPC ............. 15/250.24, 250.25, 250.27, 250.3, 15/250.14; 74/89.2, 89.22
See application file for complete search history.

(56) References Cited

U.S. PATENT DOCUMENTS

| | | | | |
|---|---|---|---|---|
| 2,651,802 A | * | 9/1953 | Kearful | 15/250.17 |
| 2,753,584 A | | 7/1956 | Oishei | |
| 2,837,758 A | * | 6/1958 | Adams et al. | 15/250.13 |
| 2,840,844 A | * | 7/1958 | McClelland | 15/250.25 |
| 2,995,766 A | * | 8/1961 | Kuhn | 15/250.25 |
| 3,087,343 A | * | 4/1963 | Wubbe | 74/89.22 |
| 3,087,345 A | * | 4/1963 | Rieckenberg | 74/89.22 |
| 3,851,351 A | | 12/1974 | Pickles et al. | |
| 5,306,991 A | | 4/1994 | Suzuki | |
| 6,279,192 B1 | | 8/2001 | Conflitti et al. | |
| 7,420,346 B2 | | 9/2008 | Metz | |

FOREIGN PATENT DOCUMENTS

| | | |
|---|---|---|
| GB | 716457 | 10/1954 |
| GB | 923465 | 4/1963 |
| GB | 2130476 | 6/1984 |
| JP | 8276825 | 10/1996 |

OTHER PUBLICATIONS

Machine translation of description portion of Nakamura publication JP 8-276,825, published Oct. 1996.*

* cited by examiner

*Primary Examiner* — Gary Graham
(74) *Attorney, Agent, or Firm* — Raymond Coppiellie; Price Heneveld LLP (57) ABSTRACT

A wiper system having an electric motor operatively associated with a primary pivot shaft assembly. Also included is a secondary pivot shaft assembly. A first windshield wiper is coupled to the primary pivot shaft assembly, and a second windshield wiper is coupled to the secondary pivot shaft assembly. The system includes a cable assembly having at least one cable operatively associated with the primary pivot shaft assembly and the secondary pivot shaft assembly, wherein the electric motor is capable of rotating the primary pivot shaft assembly and the first windshield wiper, wherein rotation of the primary pivot shaft assembly generates tension in the at least one cable, and wherein the at least one cable tension generates rotation of the secondary pivot shaft assembly and the second windshield wiper.

17 Claims, 7 Drawing Sheets

AUTOMOBILE WINDSHIELD WIPER SYSTEM HAVING DIRECT DRIVE DRUM AND CABLE ASSEMBLY

FIELD OF THE INVENTION

The present invention concerns automobile windshield wiper systems, and more particularly relates to a direct drive drum and cable wiper system.

BACKGROUND OF THE INVENTION

Automobile windshield wipers are employed to enhance visibility for a windshield by wiping excess water or buildup from a windshield. In most configurations, two wipers are employed to clear a front windshield of an automobile and, in this configuration, two motors are typically used to independently drive the two wipers of the windshield wiper system. A two motor wiper drive system requires precise coordination and timing in order to facilitate an efficient wiping procedure by rotating the two wipers in sync with one another.

Some windshield wiper systems employ one motor and a rigid linkage to drive the two wipers, however, this often requires a linkage or coupling mechanism to generate movement from one wiper to another. In either case, a two motor setup or the conventional linkage structure poses packaging issues that must be resolved during the design of the overall automobile. Accordingly, a windshield wiper system is desired having the aforementioned advantages of wiping away excess water and/or debris from a windshield, while also solving and/or making improvements on disadvantages, such as packaging issues associated with the implementation of windshield wiper systems on an automobile.

SUMMARY OF THE INVENTION

One aspect of the present invention is to provide an automobile windshield wiper system having an electric motor directly coupled with a primary drum, where rotation of the motor generates rotation of the primary drum. Further included is a primary pivot shaft having a first end and a second end, coupled to the primary drum proximate the first end, where rotation of the primary drum generates rotation of the primary pivot shaft, where the second end of the primary pivot shaft is coupled to a first windshield wiper, and where rotation of the primary pivot shaft generates rotation of the first windshield wiper. The wiper system includes a secondary drum and a secondary pivot shaft having a first end and a second end, coupled to the secondary drum proximate the secondary pivot shaft first end, the secondary pivot shaft second end coupled to a second windshield wiper. Further included is a cable assembly comprising at least one cable operatively associated with the primary drum and the secondary drum, where rotation of the primary drum generates a pulling and pushing movement of the cable assembly, where the cable assembly movement generates rotation of the secondary drum, the secondary pivot shaft, and the second windshield wiper.

Another aspect of the present invention is to provide a wiper system having an electric motor operatively associated with a primary pivot shaft assembly. Also included is a secondary pivot shaft assembly. Further included is a first windshield wiper coupled to the primary pivot shaft assembly. The wiper system also includes a second windshield wiper coupled to the secondary pivot shaft assembly. Further included is a cable assembly having at least one cable operatively associated with the primary pivot shaft assembly and the secondary assembly, where the electric motor is capable of rotating the primary pivot shaft assembly and the first windshield wiper, where rotation of the primary pivot shaft assembly generates tension in the at least one cable, and where the at least one cable tension generates rotation of the secondary pivot shaft assembly and the second windshield wiper.

A further aspect of the present invention is to provide a method for driving a windshield wiper assembly. The method includes the step of providing an electric motor directly associated with a primary pivot shaft assembly the primary pivot shaft assembly having a primary drum. Also provided is a secondary pivot shaft assembly having a secondary drum, a first windshield wiper coupled to the primary pivot shaft assembly, a second windshield wiper coupled to the secondary pivot shaft assembly, and a cable assembly having at least one cable operatively associated with the primary drum and the secondary drum, wherein the electric motor is capable of rotating the primary drum, the primary pivot shaft assembly, and the first windshield wiper, wherein rotation of the primary drum generates tension in the at least one cable, and wherein the at least one cable tension generates rotation of the secondary drum, the secondary pivot shaft assembly, and the second windshield wiper. The method also includes the steps of supplying power to the electric motor, driving rotation of the primary pivot shaft assembly and primary drum directly with the electric motor, driving rotation of the first windshield wiper with the primary pivot shaft assembly, and driving rotation of the secondary drum, the secondary pivot shaft assembly, and the second windshield wiper with the tension of the at least one cable.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
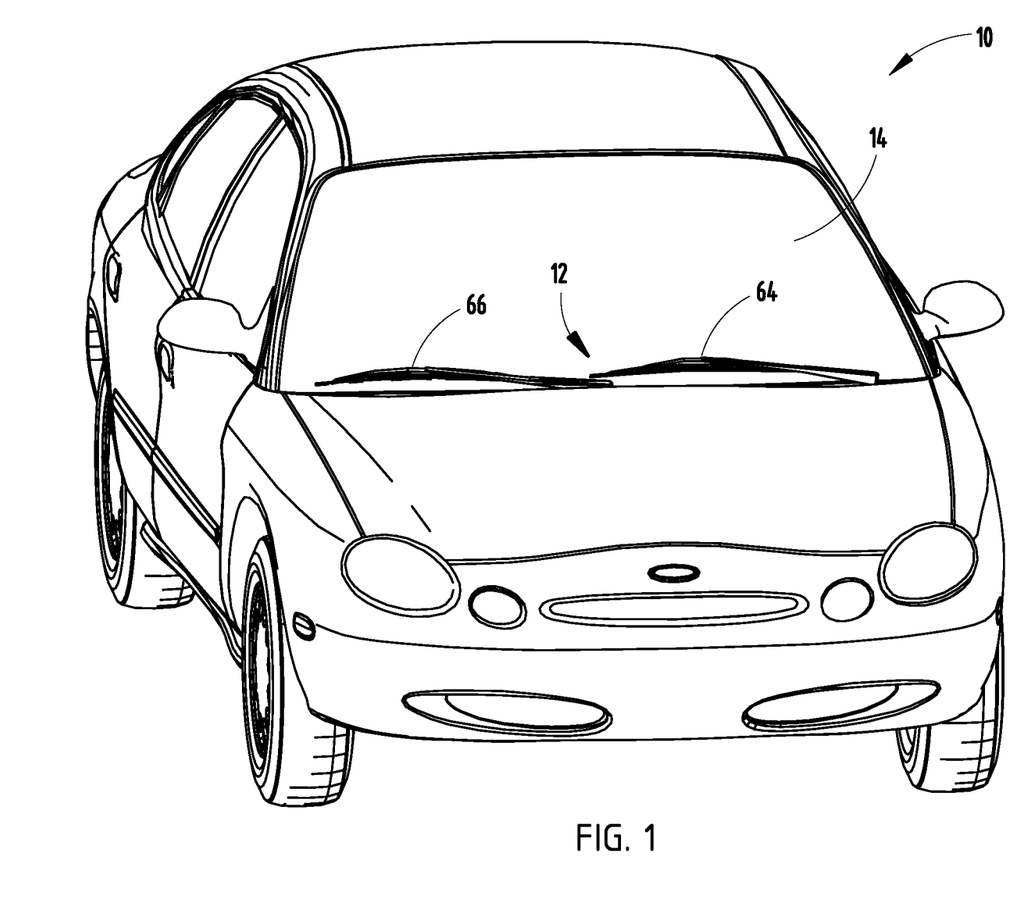
FIG. 1 is an elevated front view of an automobile equipped with a windshield wiper system.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, the reference number 10 generally designates an automobile generally having a front windshield 14 and a pair of windshield wipers 64 and 66, and further equipped with a windshield wiper system 12 embodying the present invention. The wiper system 12 has an electric motor operatively associated with a primary pivot shaft assembly. The wiper system 12 also has a secondary pivot shaft assembly. A first windshield wiper is coupled to the primary pivot shaft assembly. A second windshield wiper is coupled to the secondary pivot shaft assembly. Finally, the wiper system 12 has a cable assembly with at least one cable operatively associated with the primary pivot shaft assembly and the secondary pivot shaft assembly. The electric motor is capable of rotating the primary pivot shaft assembly and the first windshield wiper. The rotation of the primary pivot shaft assembly generates tension in the cable, and the cable tension generates rotation of the secondary pivot shaft assembly and the second windshield wiper.

The automobile 10 typically includes an engine compartment that is capable of generating an electrical power supply and the windshield 14 extends upwardly from a location neighboring a firewall separating the engine compartment and the passenger compartment.

The windshield wiper system 12 is located within the engine compartment and results in a rotation of at least one, and typically two, windshield wiper blade(s) 64 and 66 along the outside surface of the windshield 14.

Figure 2:
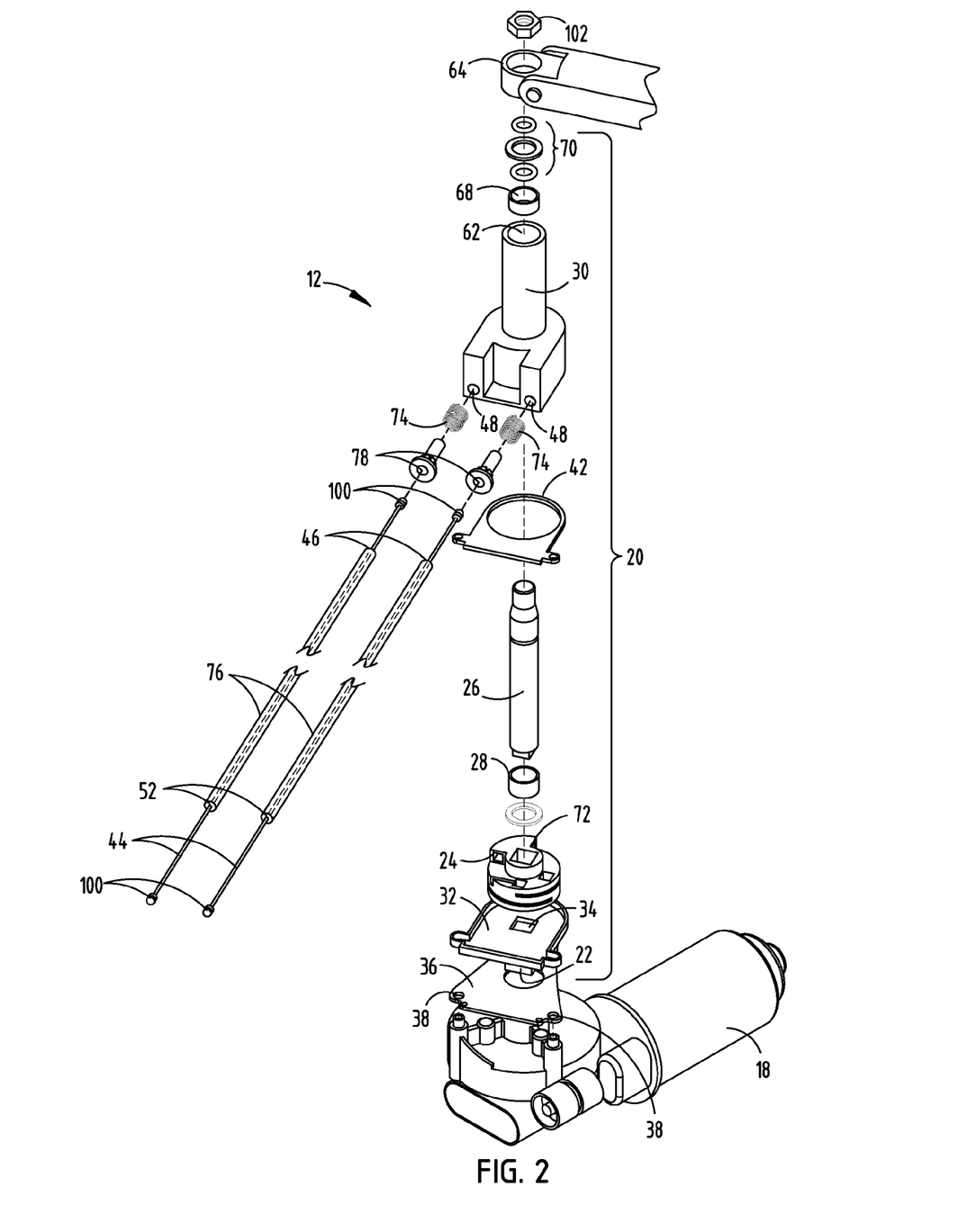
FIG. 2 is an elevated exploded view of a primary pivot shaft assembly of the windshield wiper system, having an attachment to a motor and a pair of cables, according to one embodiment.
Figure 3:
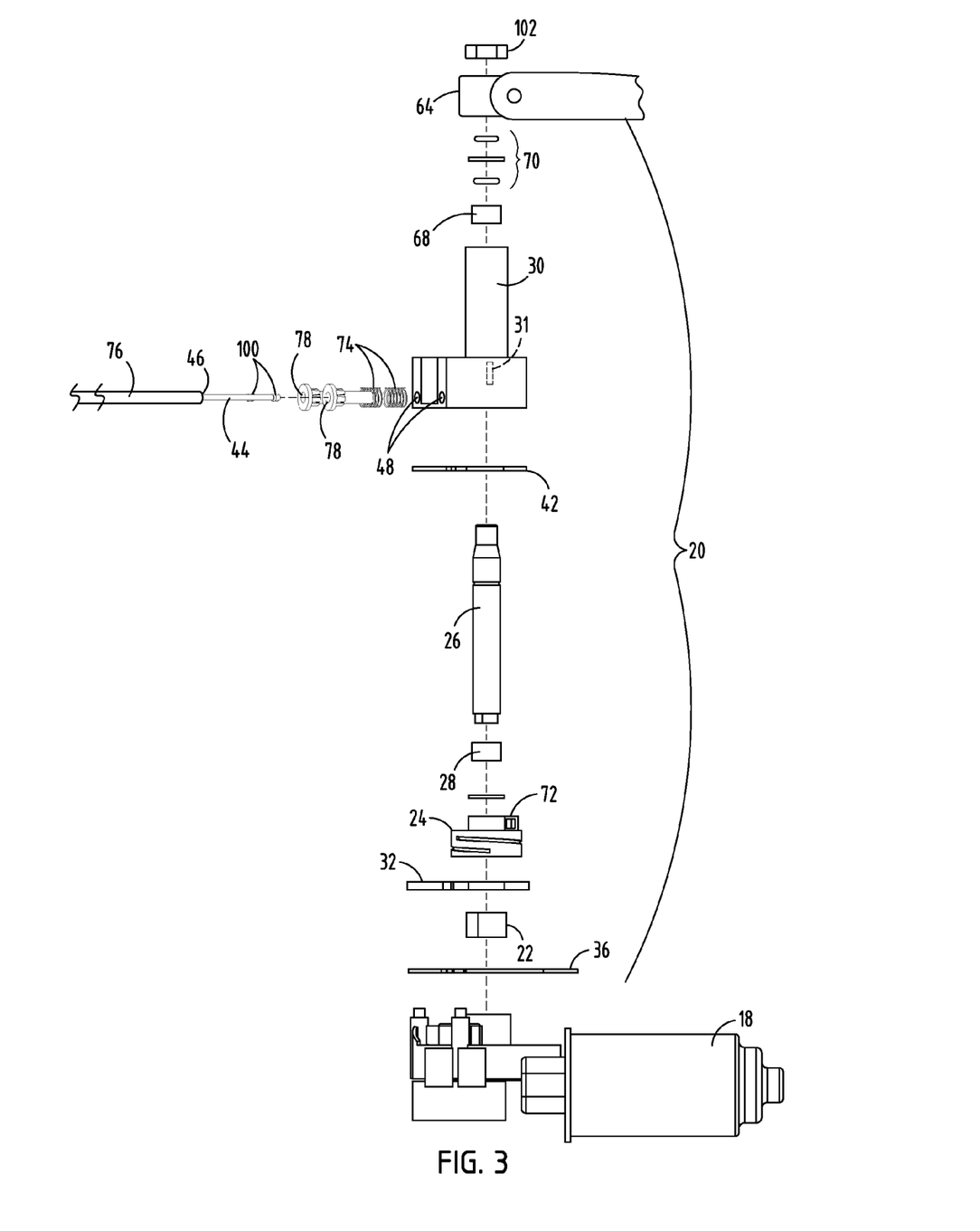
FIG. 3 is an elevational top exploded view of the primary pivot shaft assembly shown in FIG. 2.
Figure 4:
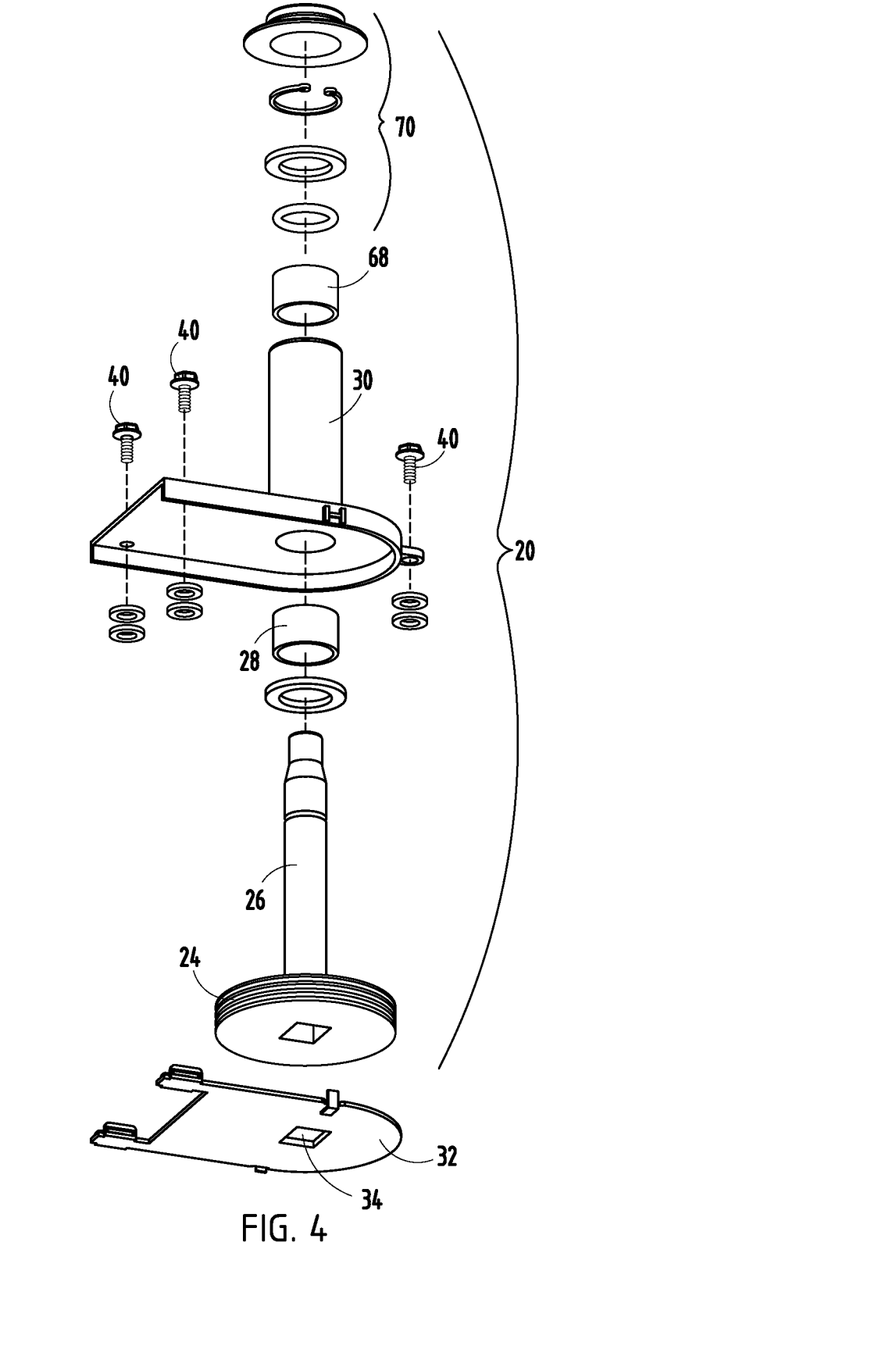
FIG. 4 is an elevational exploded view of the primary pivot shaft assembly, generally disposed within a primary pivot housing.

Referring to FIGS. 2 and 3, a portion of the windshield wiper system 12, including the primary pivot shaft assembly 20, is illustrated having an electric motor 18 for driving the assembly and hence the wipers 64 and 66. The motor 18 may be connected to and powered by the vehicle electrical power supply (e.g., 12 volt battery). The motor 18 converts electrical power into pure mechanical rotation, via a rotating member, such as an output shaft or other rotational component. Such a motor 18 configuration provides the ability to directly attach the motor 18 to windshield wiper system 12 components. Additionally, the motor 18 may be reversing, eliminating the need for internal linkages to convert motion from rotation to oscillation. However, it is conceivable that the motor 18 would not be reversible, in which case the motor 18 would be provided with an internal linkage to provide an oscillatory output motion.

In one embodiment, as shown in FIGS. 2-7, the motor 18 is directly coupled to a primary pivot shaft assembly 20, via a drum driver 22. The primary pivot shaft assembly 20 has a primary drum 24 that oscillates in conjunction with the motor 18 output, via the drum driver 22. The primary drum 24 is coupled to a primary pivot shaft 26 by any suitable fastener such as a screw, bolt, nut, and/or washer, or any combination thereof. Rotation at the point of coupling of the primary drum 24 in the primary pivot shaft 26 occurs within a bearing 28, in order to allow constrained relative motion between the primary drum 24 and the primary pivot shaft 26. The primary pivot shaft assembly 20 resides within a primary pivot housing 30. The primary pivot housing 30 has a pivot housing cover 32 located proximate the motor 18 and includes an opening 34 of relatively equal size and shape as that of the drum driver 22, thereby allowing the drum driver 22 to directly mate with the primary drum 24. The mating of the drum driver 22 and the primary drum 24 provides direct coupling of the motor 18 to the primary pivot shaft assembly 20 and generates an oscillatory motion to the primary drum 24 and the primary pivot shaft 26. Alternatively, the drum driver 22 may be a worm gear, or connected to a worm gear, capable of rotatably driving the primary drum 24. A bracket 36 acts as an interface to facilitate mounting of the pivot housing cover 32 to the motor 18. A plurality of holes 38 proximate the perimeter of the bracket 36 allow mounting of the pivot housing 30 and the pivot housing cover 36 by screws, bolts, or any other suitable mechanical fasteners 40. Also included within the primary pivot housing 30 is a gasket 42 to assist manufacturing tolerance issues.

According to one embodiment, the primary drum 24 has a substantially circular shape portion, but it is conceivable that the shape may be helical according to another embodiment. Connected to the primary drum 24 is at least one cable 44. In the embodiment shown, two cables 44 are connected to the primary drum 24, and this connection is made by a first end 46 of the cable(s) 44 through apertures 48 in the primary pivot housing 30. Water proof rubber grommets may be included at this connection in order to prevent the entry of water into the primary pivot housing 30 or the cable(s) 44. Each cable 44 will extend along a substantially parallel plane to a secondary pivot shaft assembly 50. The secondary pivot shaft assembly 50 includes similar components as that of the primary pivot shaft assembly 20, and connection of a second end 52 of the cable(s) 44 to a secondary drum 54 is made through apertures in a secondary pivot housing 56, as is done for the connection at the first end 46 of the cable(s) 44 to the primary pivot housing 30. It is conceivable that multiple cables 44 could enter through a single aperture in either the primary or secondary pivot housing 30, 56. As described above, the secondary pivot shaft assembly 50 is similar to the primary pivot shaft assembly 20, however, an association with a motor or drum driver is not included. Instead, the motor 18 and drum driver 22 are used to drive both assembly 20 and 50 via the cable assembly, thereby eliminating the need for multiple motors and drivers. The secondary pivot shaft assembly 50 includes the secondary drum 54 that is coupled to a secondary pivot shaft 58 in a similar manner as that of the coupling of the primary drum 24 and the primary pivot shaft 26, as described above. Furthermore, the secondary drum 54 and the secondary pivot shaft 58 reside within the secondary pivot housing 56, with the secondary pivot housing 56 fastened to a secondary pivot housing cover 60 by screws, bolts, or any other suitable mechanical fastener.

Both the primary pivot housing 30 and the secondary pivot housing 56 include an opening 62 at an end distant the end which is covered by the primary and secondary pivot housing covers 30, 56. Proximate the opening 62 is the coupling of the primary pivot shaft 26 and the secondary pivot shaft 58 to a first windshield wiper 64 and a second windshield wiper 66, respectively. This coupling is made by a nut 102 at the tip of the pivot shafts 26, 58. Also proximate this opening 62 is a bearing 68 and a retainer 70 that constrains movement between the wipers 64, 66 and shafts 26, 58.

Producing different wipe angles of the first and second windshield wipers 64, 66 is often desired, and may be accomplished by providing the primary drum 24 and the secondary drum 54 with different size diameters. Distinct diameters impose different rotation angles of the primary pivot assembly 20 and secondary assembly 50, and therefore different rotation angles of the first and second windshield wipers 64, 66. This allows the second wiper 66 to rotate at a greater angle than that of the first wiper 64, ensuring prevention of built-up water resulting from the second wiper 66 motion. Typically, the first wiper 64 will rotate approximately 90° and the second wiper 66 will rotate approximately 135° in tandem systems, while both the first and second wipers 64, 66 rotate 90° in opposed systems, however, other wipe angles may be employed.

The primary drum 24 or the secondary drum 54 may include a key 72 that associates with at least one stopping feature 31 within the primary or secondary pivot housing 30, 56. As shown in the embodiment illustrated in FIG. 3, the stopping feature 31 within the primary drum 30 includes a protrusion that associates with the key 72 to restrict the rotation of the primary drum 24. The stopping feature 31 may be used to position the wipers 64, 66 in an appropriate park position when the windshield wiper system 12 is not in use. Additionally, the stopping feature 31 may be used to control wipe pattern growth and wipe angle limits at the point of reversal.

Figures 11, 12:
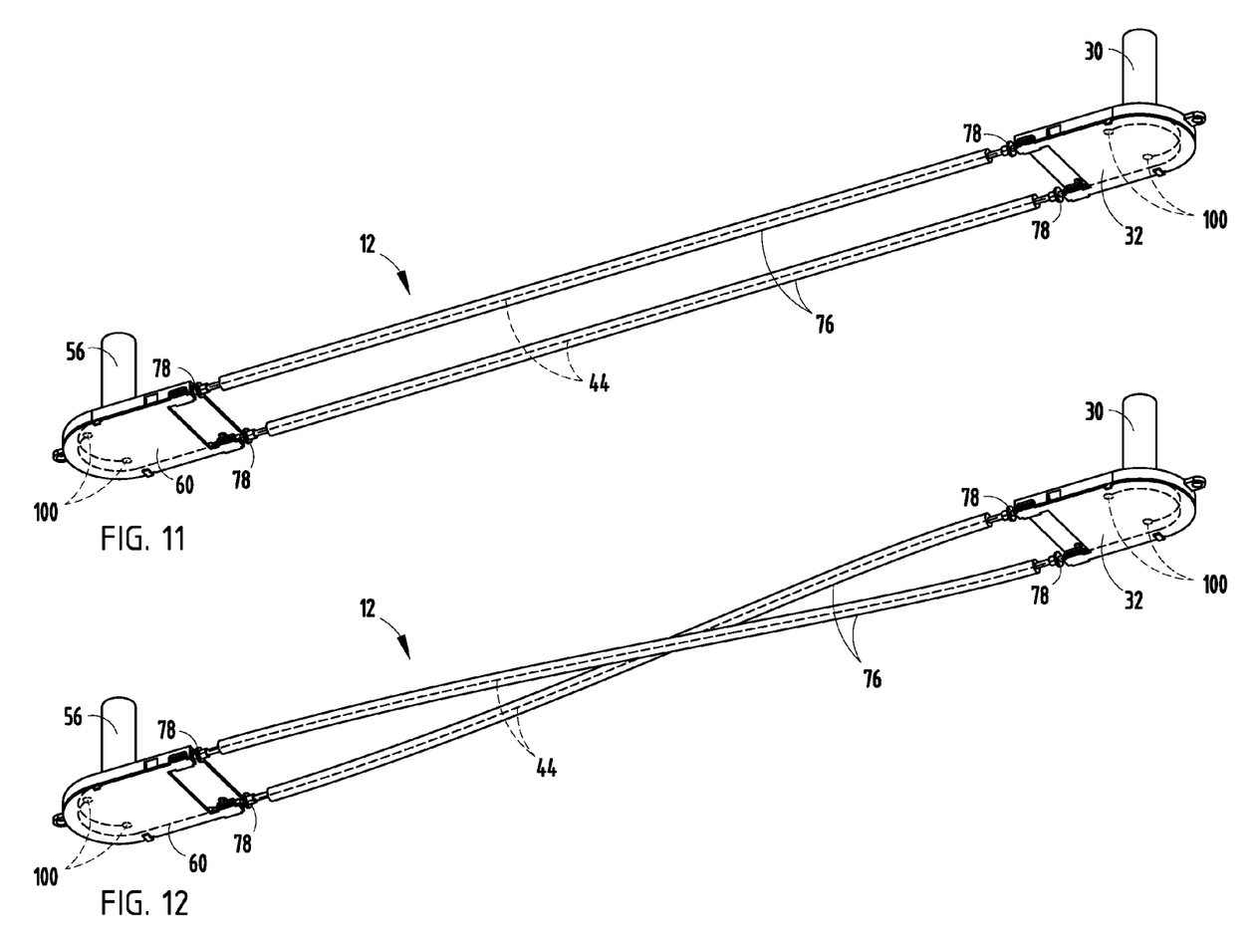
FIG. 11 is an elevated view of the windshield wiper system providing tandem wiper motion, according to one cable assembly configuration.
FIG. 12 is an elevated view of the windshield wiper system providing opposing wiper motion, according to another cable assembly configuration.

The cable(s) 44 are configured to have some degree of flexibility, thereby alleviating packaging issues associated with rigid members used to drive wiper systems. The cables may be made of steel, metal alloys, stainless steel, or any other material suitable for the environment in which the cables would operate. Furthermore, the cable arrangement may be stranded, similar to what is used in bicycle brake cables, however it is conceivable that the cables may be braided, bundled, corded, or configured in any other suitable manner. The diameter of the cables 44, as well as the number of strands employed would vary, depending on the wiper system requirements. The connection of the cable(s) 44 at the first and second ends 46, 52 may include coil springs 74 to control cable tension, as well as nipple ends 102. Self-tensioning devices may be included to control overall system tension. In order to protect cable(s) 44 during operation and to increase structural integrity, the cable(s) 44 may be encased by a flexible conduit 76 as shown in FIGS. 11 and 12. The conduit 76 may be coiled or stranded, similar to the inner cable 44. In this cable configuration, cable end caps 78 may be included proximate the first and second end 46, 52 connection points. The overall cable assembly includes an inner cable 44, an outer conduit 76, and nipple ends 100 that connect to the primary and secondary drums 24, 54. Additionally, a push-pull cable may be implemented to provide the cable(s) 44 with a locking mechanism, similar to that used in door latches, in order to prevent inadvertent movement of the wiper system 12.

Figure 5:
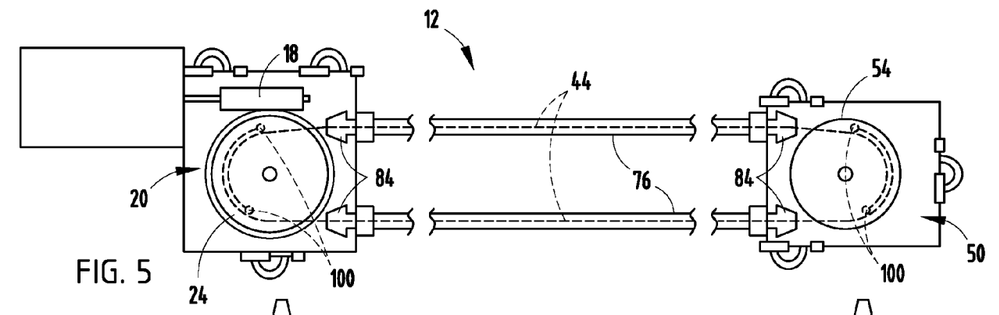
FIG. 5 is a rear schematic view of the windshield wiper system, according to one embodiment.
Figure 6:
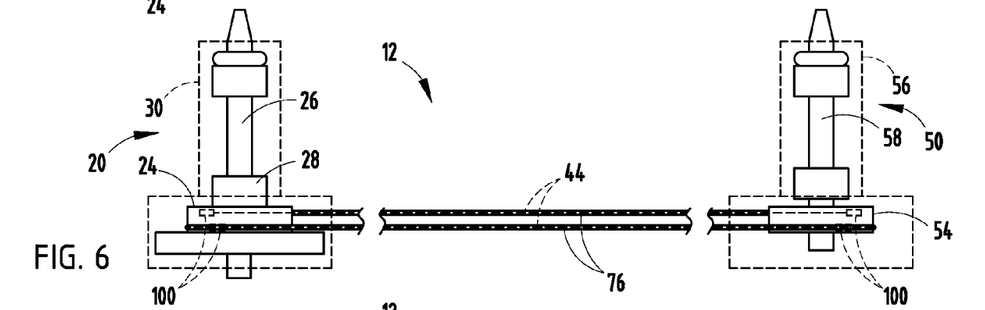
FIG. 6 is a top schematic view of the windshield wiper system shown in FIG. 5.
Figure 7:
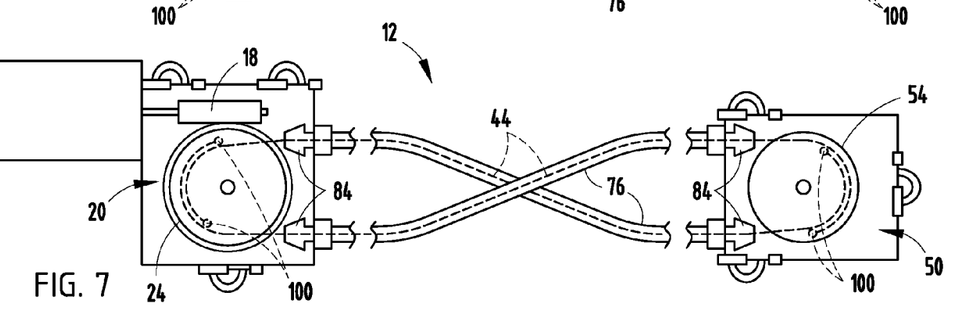
FIG. 7 is a rear schematic view of the windshield wiper system having a cross-routed cable assembly, according to another embodiment.

When in operation, the oscillating motion of the primary drum 24 and the secondary drum 54 generated by the motor 18 creates a tension force upon the cable(s) 44, thus imparting a controlled oscillation of the secondary pivot shaft assembly 50 and thereby rotating the first and second windshield wipers 64, 66, without requiring direct power to generate such oscillation. In a two cable embodiment, various configurations may be employed to generate a variety of wiper kinematic profiles. Two such configurations are shown in FIGS. 11 and 12. A first configuration is a parallel alignment, resulting in a tandem windshield wiper motion (FIGS. 5 and 11). Often a butterfly or opposing windshield wiper motion is desired and such a motion may be generated by simply cross routing the cables 44 at an intermediate location (FIGS. 7 and 12). The tension force on each cable 44 produces the desired motion based on the configurations described above.

Figure 8:
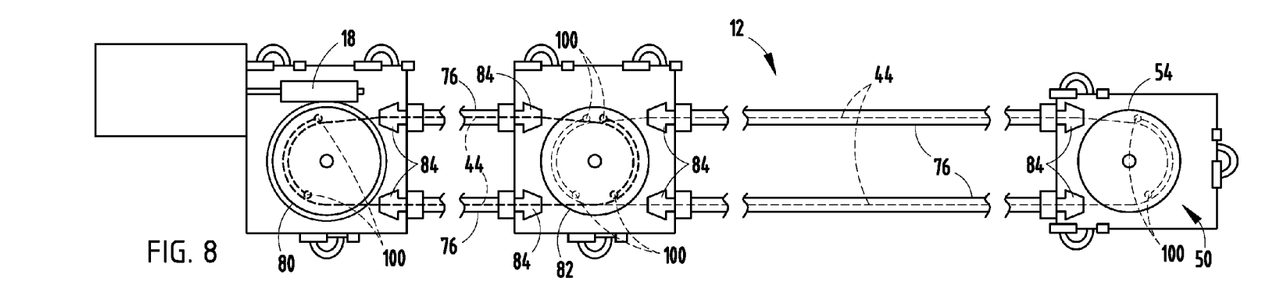
FIG. 8 is a rear schematic view of the windshield wiper system, according to another embodiment.
Figure 9:
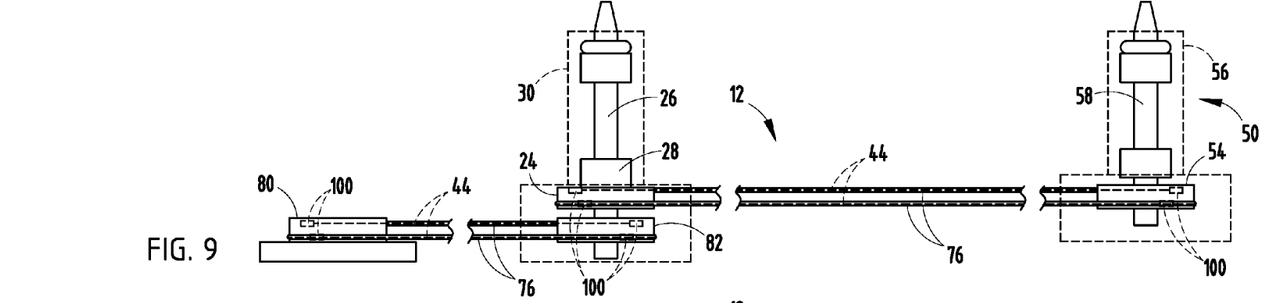
FIG. 9 is a top schematic view of the windshield wiper system shown in FIG. 8.
Figure 10:
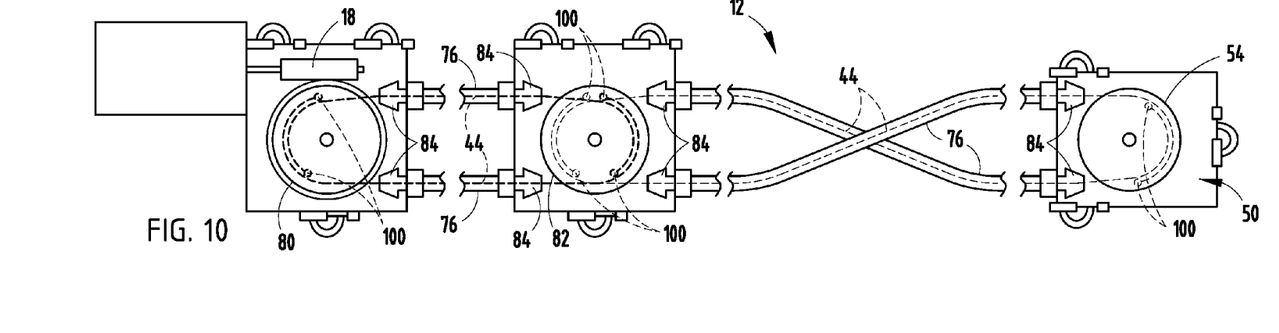
FIG. 10 is a rear schematic view of the windshield wiper system having a cross-routed cable assembly, according to a further embodiment.

In an alternative embodiment, as shown in FIGS. 8-10, the motor 18 may be operatively associated with the primary pivot shaft assembly 20, rather than directly coupled thereto. The operative association may be made by including one or more additional drum and cable connections 84. This embodiment allows the motor 18 to be placed at a remote location, where direct coupling to the primary pivot shaft assembly 20 is not desired, due to packaging or other issues. Such an embodiment includes identical features as the embodiment shown in FIGS. 2-7, with the exception of additional drum(s) and cable(s), and therefore similar reference numerals have been employed. The motor 18 is coupled to a first additional drum 80 that has connection to cables 44, as described above. The cables 44 extend to connect to another additional drum 82 that directly associates with the primary pivot shaft assembly 20, thereby providing the rotational movement of the wiper system 12, as described above for the first embodiment. Like the first embodiment, the cables may be disposed in various configurations to provide various windshield wiper 64, 66 kinematic profiles, specifically a parallel alignment producing a tandem wiper profile (FIGS. 8 and 11), and a cross-cable alignment resulting in a butterfly profile (FIGS. 10 and 12).

Accordingly, the windshield wiper system 12 advantageously eliminates the need for dual motor assemblies when packaging constraints do not allow the use of traditional opposed or butterfly linkages, while also providing an appropriate substitute for tandem wiper linkage architectures. Additionally, the system reduces weight and provides a simple family of components for different vehicles without resulting in excessive tooling costs.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. An automobile windshield wiper system comprising:
 an electric motor operably coupled with a primary drum, wherein the motor generates rotation of the primary drum;
 a primary pivot shaft having a first end coupled to the primary drum and a second end coupled to a first windshield wiper, wherein rotation of the primary drum generates rotation of the primary pivot shaft, and wherein rotation of the primary pivot shaft generates rotation of the first windshield wiper;
 a secondary drum;
 a secondary pivot shaft having a first end coupled to the secondary drum and a second end coupled to a second windshield wiper;
 a cable assembly comprising at least one cable operatively associated with the primary drum and the secondary drum, wherein rotation of the primary drum generates a pulling movement of the cable assembly, and wherein the cable assembly movement generates rotation of the secondary drum, the secondary pivot shaft, and the second windshield wiper;

a primary pivot housing fully enclosing an outer periphery of the primary drum to define a primary interior portion, and a secondary pivot housing fully enclosing an outer periphery of the secondary drum to define a secondary interior portion, wherein the primary and secondary drums include a respective key, and wherein the interior portions of the primary and secondary pivot housings include a respective protrusion that associates with the respective key to restrict the rotation of the primary and secondary drums.

2. The automobile windshield wiper system of claim 1, wherein the electric motor is a reversing motor that provides an oscillatory motion to the first and second windshield wipers, and wherein the electric motor is coupled to a worm gear that is operably coupled with a drum driver that is coupled to the primary drum.

3. The automobile windshield wiper system of claim 2, wherein the primary drum and the secondary drum are circular, the primary drum having a first diameter, the secondary drum having a second diameter that is less than the first diameter, and wherein the drum driver includes a helical gear that engages the worm gear.

4. The automobile windshield wiper system of claim 1, wherein the primary and secondary pivot housings include at least one aperture to allow entry of the at least one cable.

5. The automobile windshield wiper system of claim 1, wherein the at least one cable is a flexible material, and wherein the cable assembly includes at least one spring.

6. The automobile windshield wiper system of claim 1, wherein the at least one cable comprises a first cable for rotating the secondary drum in a first direction and a second cable for rotating the secondary drum in a second direction.

7. The automobile windshield wiper system of claim 1, wherein the at least one cable is encased within a flexible conduit.

8. A wiper system comprising:
a primary pivot shaft assembly having a primary drum and a housing fully enclosing an outer periphery of the, primary drum to define an interior portion;
a secondary pivot shaft assembly having a secondary drum;
a first windshield wiper coupled to the primary pivot shaft assembly;
a second windshield wiper coupled to the secondary pivot shaft assembly;
a cable assembly having a cable between the primary drum and the secondary drum, wherein rotation of the primary drum generates tension in the cable and thereby rotates the secondary drum and the second windshield wiper;
an electric motor having a gear box operably coupled to a central axis of the primary drum for rotating the first and second windshield wipers in an oscillatory motion; and
a wiper positioning feature having a key on the primary drum and a stopping feature on the interior portion of the primary housing that is configured to abut the key for restricting rotation of the primary drum.

9. The wiper system of claim 8, wherein the gear box includes a worm gear coupled with a drive shaft of the motor and a helical gear engaged with the worm gear and coupled with the primary drum.

10. The wiper system of claim 9, wherein the primary drum and the secondary drum are circular, the primary drum having a first diameter, the secondary drum having a second diameter less than the first diameter.

11. The wiper system of claim 8, wherein the housing includes at least one aperture to allow entry of an end portion of the cable assembly, and wherein the primary and secondary drums include a helical shape.

12. The wiper system of claim 8, wherein the electric motor is operatively associated with the secondary pivot shaft assembly.

13. The wiper system of claim 8, wherein the cable is a flexible material, and wherein an end portion of the cable assembly includes at least one spring.

14. The wiper system of claim 8, wherein the cable is encased within a flexible conduit.

15. The wiper system of claim 8, wherein the electric motor is located at a remote location, and wherein the operative association between the motor and the primary pivot shaft assembly comprises a third drum that is associated with the primary pivot shaft assembly, a fourth drum directly coupled to the motor, and at least one cable operably associated with the third and fourth drums.

16. The wiper system of claim 8, wherein the cable comprises a first cable for rotating the secondary pivot shaft assembly in a first direction and a second cable for rotating the secondary drum in a second direction.

17. A wiper system comprising:
a primary drum coupled to a first wiper;
a secondary drum coupled to a second wiper;
an electric motor coupled with the primary drum;
a cable coupled between the primary and secondary drums to rotate the secondary drum;
a key on the primary drum; and
a housing fully enclosing an outer periphery of the primary drum to define an interior portion with a protrusion for abutting the key to restrict rotation of the primary drum.

* * * * *